Feb. 29, 1944. H. A. KNOX 2,342,675
TRACK SHOES
Filed June 12, 1942   6 Sheets-Sheet 1
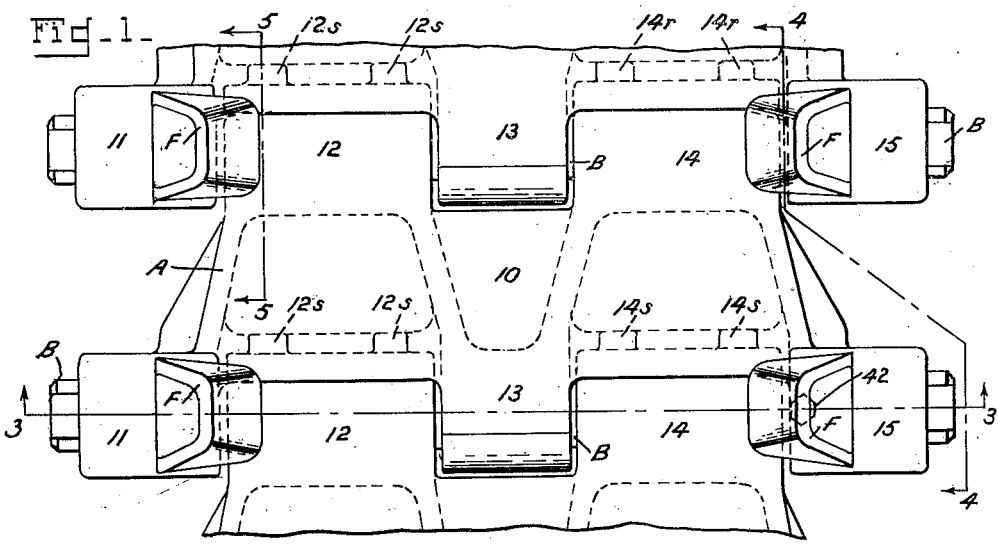
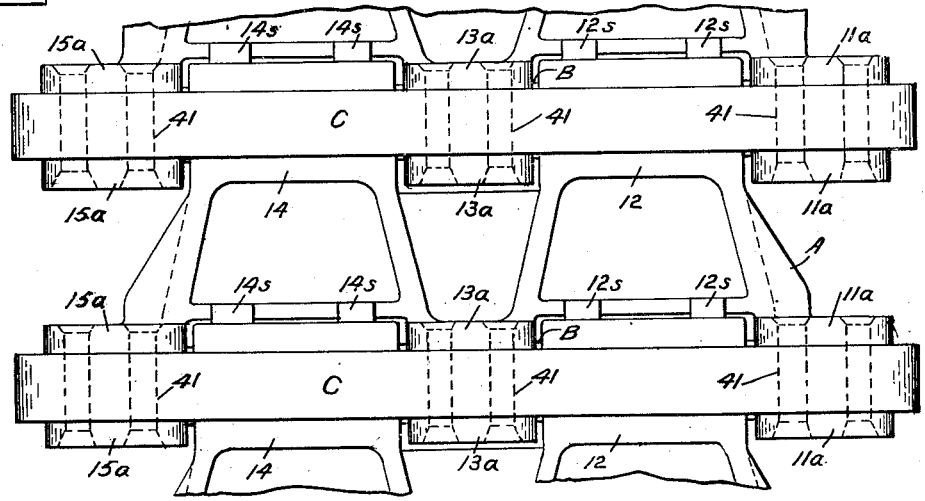
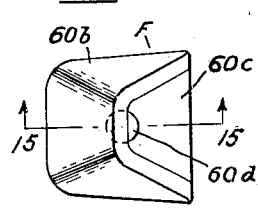
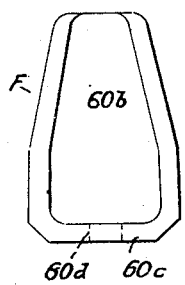
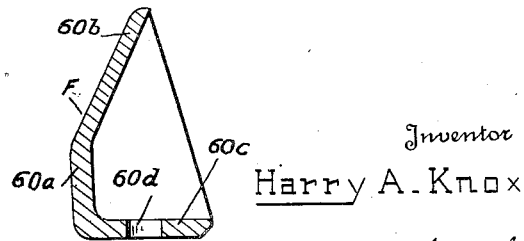
Inventor
Harry A. Knox
By Kessenich & J. H. Church
Attorneys

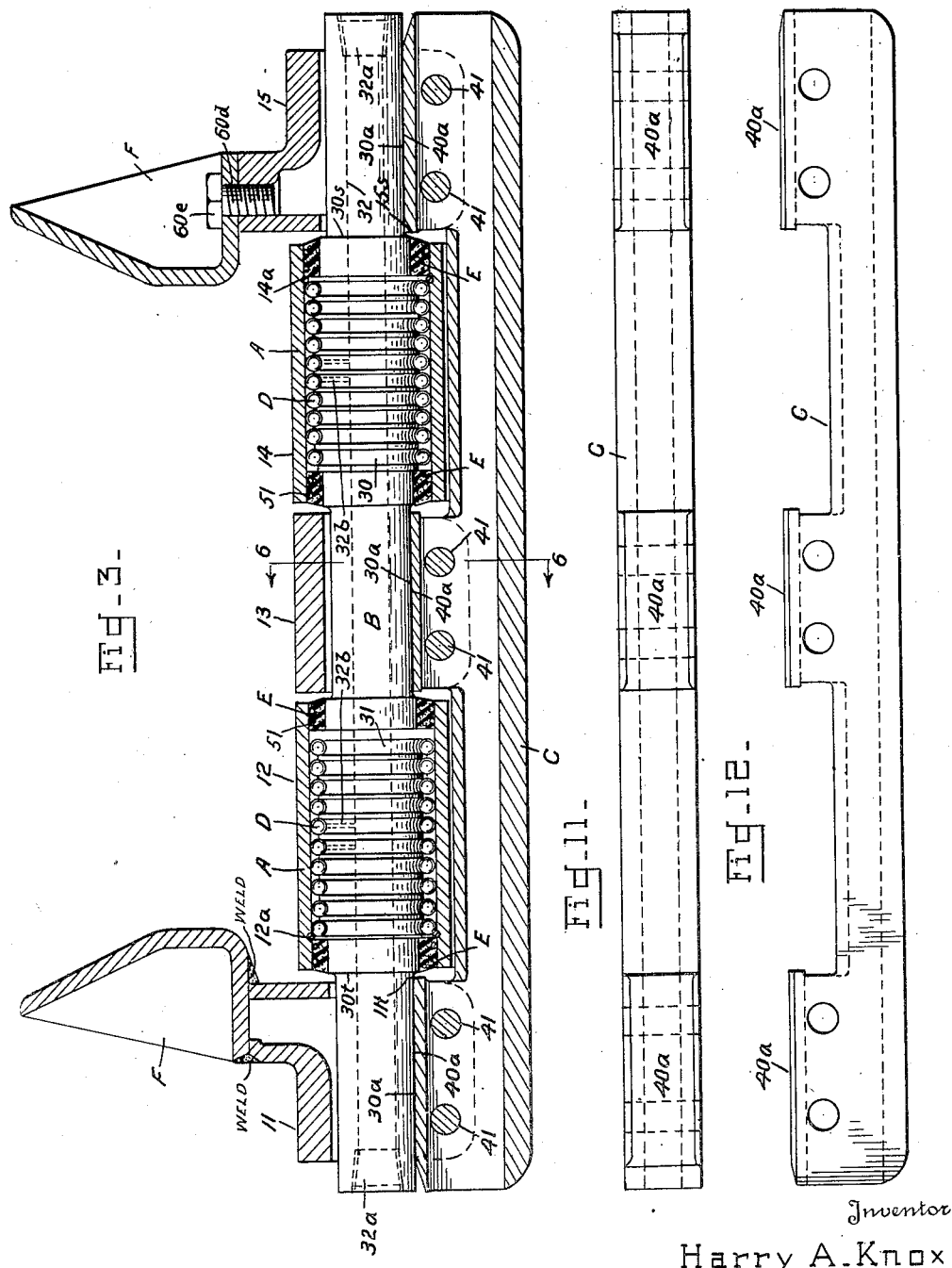

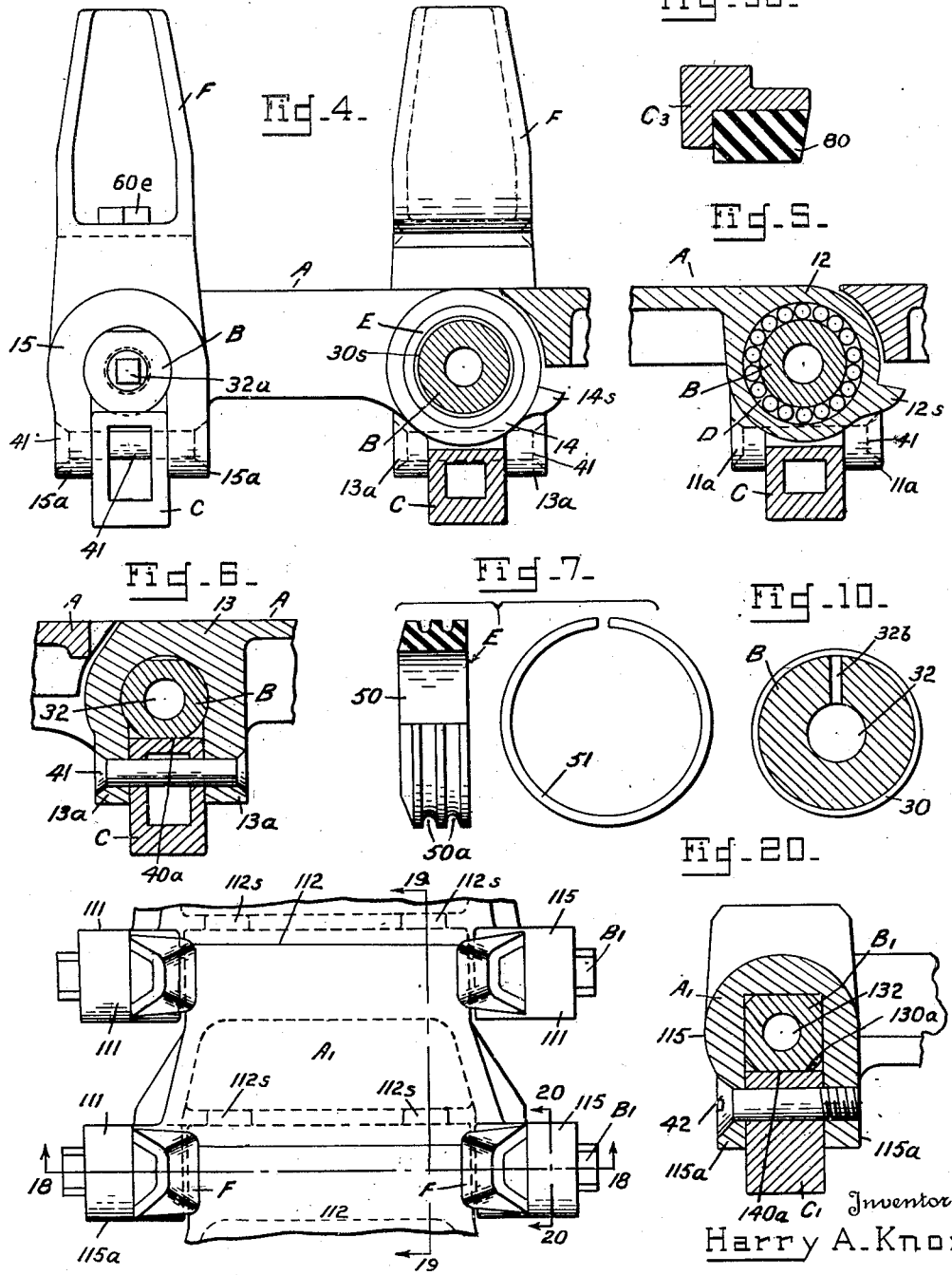

Feb. 29, 1944.  H. A. KNOX  2,342,675
TRACK SHOES
Filed June 12, 1942  6 Sheets-Sheet 4
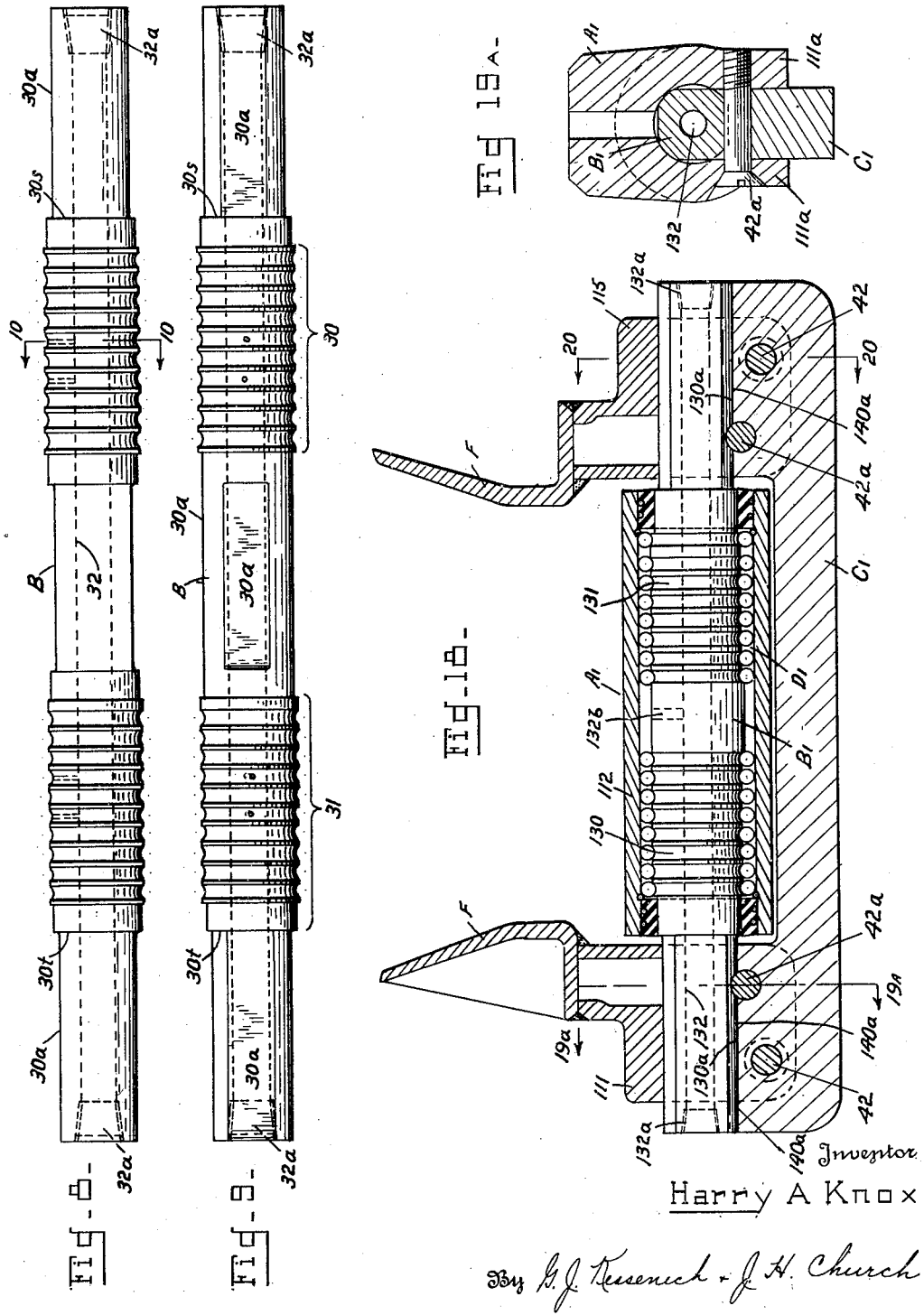
Inventor
Harry A Knox
By G. J. Kesenich & J. H. Church
Attorneys Feb. 29, 1944.　　　　H. A. KNOX　　　　2,342,675
TRACK SHOES
Filed June 12, 1942　　　6 Sheets-Sheet 5
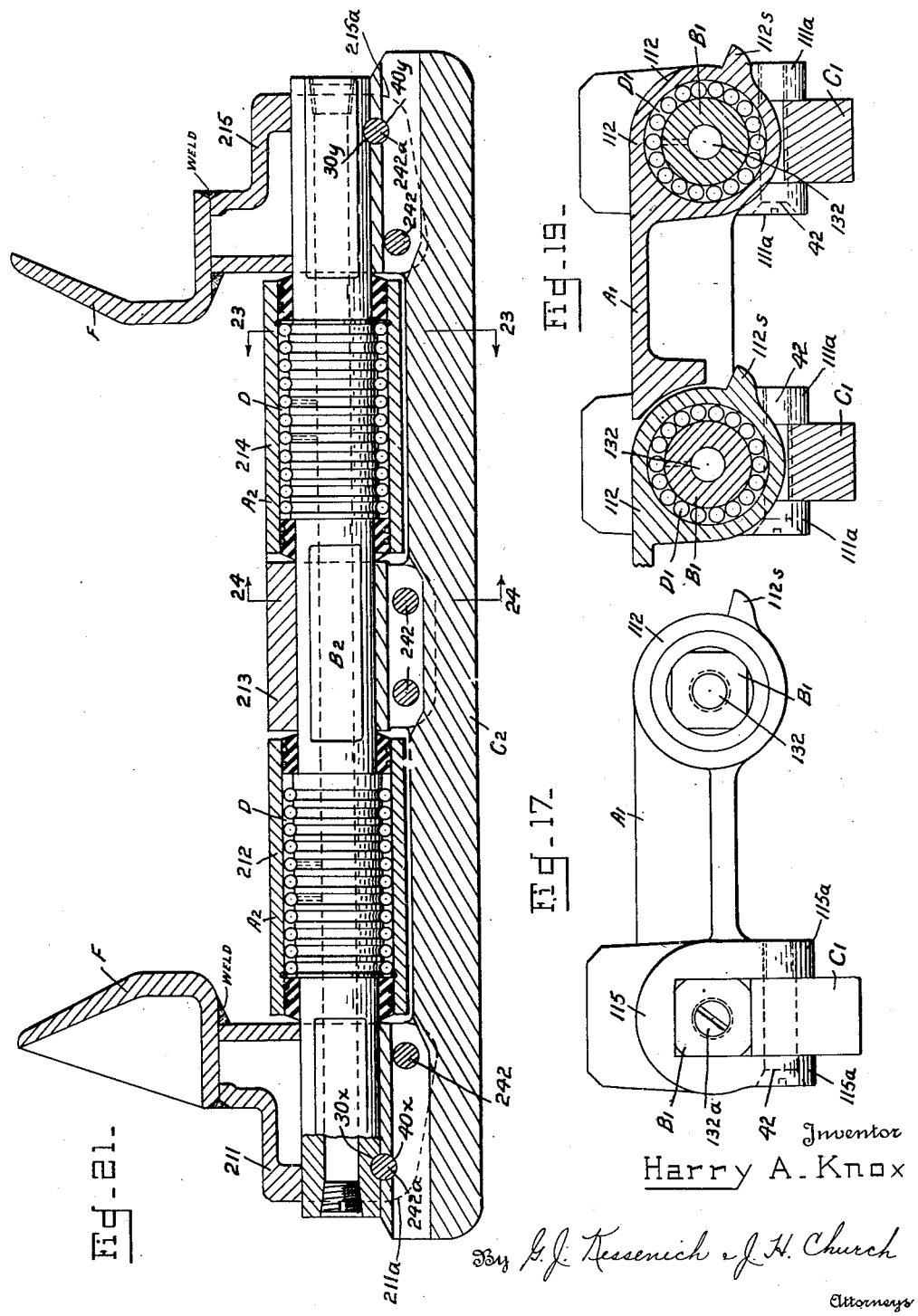
Inventor
Harry A. Knox
By G. J. Kessenich & J. H. Church
Attorneys

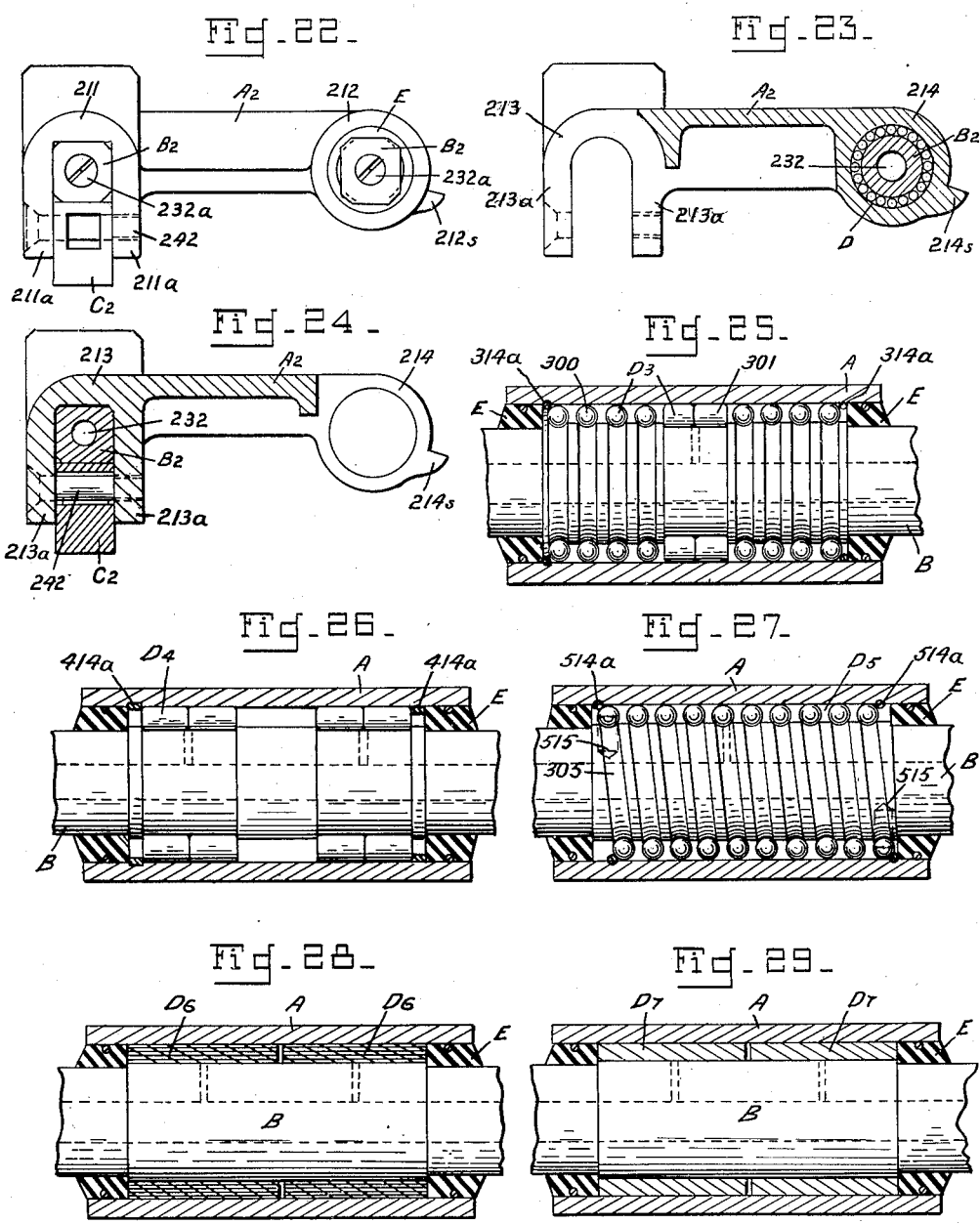

Patented Feb. 29, 1944

2,342,675

UNITED STATES PATENT OFFICE 2,342,675

TRACK SHOE

Harry A. Knox, Washington, D. C.

Application June 12, 1942, Serial No. 446,709

33 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to track shoes.

An object of this invention is to provide an all metal track having substantially no strategically important rubber therein.

Another object of this invention is to provide a track in which flexure is accommodated by ball bearings thus eliminating the stretch which was common in the prior art rubber bushing track and reducing friction heat and wear to a minimum.

Another object of this invention is to provide ball bearing connecting means in a track in which all radial and end thrust loads are taken directly by at least some of the balls comprising the ball bearing connection.

Another object of this invention is to provide a track having only three main component parts, i. e., a link pin, a block and a grouser.

Another object of this invention is to provide a track having non-friction bearings and in which track stretch is substantially eliminated thus reducing driving sprocket friction since the track remains aligned in use.

Another object of this invention is to provide a track having easily detachable grousers which may be replaced by rubber faced road pads.

Another object of this invention is to provide a track in which no clips for removing static charges is necessary as is the case in the prior art rubber bushing track shoes.

Another object of this invention is to provide a metallic track which may be operated with or without lubrication, but which also incorporates lubricating means.

Another object of this invention is to provide a track having a center support bearing which, in effect, strengthens the link pin and grouser forming a part of the track.

Another object of this invention is to provide a grouser construction wherein there is no direct and substantially no indirect stress on the rivets or bolts which serve to mount the grouser on the track.

Another object of this invention is to provide a lubricated anti-friction bearing in a track and more particularly to provide a closure member for the bearing.

The specific nature of the invention as well as other objects and advantages thereof will clearly appear from a description of a preferred embodiment as shown in the accompanying drawings in which:

Figure 1 discloses a plan view of the inside of a portion of a track embodying one phase of my invention.

Figure 2 discloses a plan view of the outside of a portion of the track shown in Fig. 1.

Figure 3 is a sectional view taken substantially on line 3—3 of Figure 1.

Figure 4 is a side elevation partly in section taken substantially on line 4—4 of Fig. 1.

Figure 5 is a fragmentary section taken substantially on line 5—5 of Fig. 1 without the track guide F (see Fig. 4) shown in elevation.

Figure 6 is a fragmentary section taken substantially on line 6—6 of Fig. 3 without the track guide F (see Fig. 4) shown in elevation.

Figure 7 is a view, partly in section, of the closure member E incorporating packing ring 51.

Figure 8 is a plan view of the link pin B.

Figure 9 is a plan view of the link pin B after rotating the pin of Fig. 8 ninety degrees.

Figure 10 is a section taken substantially on line 10—10 of Fig. 8.

Figure 11 is a plan view of the cleat or grouser C of the track shown in Fig. 1.

Figure 12 is a plan view of the cleat or grouser C after rotating it ninety degrees from the position in Fig. 11.

Figures 13 and 14 are plan and end views respectively of the detachable wheel guide F shown on the right hand side of the track in Fig. 3.

Fig. 15 is a view taken substantially on line 15—15 of Fig. 13.

Fig. 16 is a plan view of a portion of a smaller modified track and distinguishes over the track of Fig. 1, inter alia, in that no center bearing is provided.

Fig. 17 is an end view of one of the track portions shown in Fig. 16 without wheel guide F mounted thereon.

Figure 18 is a section taken substantially on line 18—18 of Fig. 16.

Figure 19 is a sectional view taken substantially on line 19—19 of Fig. 16 but without wheel guide F mounted on the block.

Figure 19a is a sectional fragmentary view taken substantially on line 19a—19a of Fig. 18.

Fig. 20 is a fragmentary view taken substantially on lines 20—20 of Fig. 18 but without the wheel guide F mounted.

Fig. 21 is a section through another track of the type shown in Fig. 1 and corresponds to the section shown in Fig. 3.

Fig. 22 is an end view of a portion of the track shown in Figure 21 with the wheel guide F not mounted thereon and taken from the left side in Fig. 21.

Figs. 23 and 24 are fragmentary sections taken substantially on corresponding lines in Fig. 21.

Fig. 25 discloses a fragmentary section through a modified track and discloses a combination of balls 300 and roller bearings 301 separating the link pin B from the block A.

Fig. 26 discloses a fragmentary section through a modified track and discloses roller bearings $D_4$ separating the link pin B from the block A.

Fig. 27 discloses a fragmentary section through a modified track and discloses balls $D_5$ in a spiral link pin groove separating the link pin B from the block A.

Fig. 28 discloses a section through a modified track and discloses a compressed fabric material $D_6$ separating the link pin B from the block A.

Fig. 29 discloses a section through a modified track and discloses a prepared metal bushing $D_7$ separating the link pin B from the block A.

Fig. 30 is a section through a modified cleat or grouser $C_3$ and this section corresponds to a section taken on lines 5—5 of Fig. 1 when grouser $C_3$ replaces grouser C.

Referring to the drawings, my track embodies three essential elements, i. e., the block A, link pin B, and grouser C.

In Figures 1–15 the block A comprises a unitary body 10 having spaced coaxial hollow portions 12, 14 on one end thereof and spaced hollow portions 11, 13, 15 on the other end thereof. The first mentioned spaced coaxial hollow portions 12, 14 are cylindrical so that a link pin B may be threaded therethrough by moving the link pin in its longitudinal direction. The second mentioned block hollow portions 11, 13, 15 have openings therein defined by pairs of spaced jaws 11a, 13a, 15a, respectively, whereby a link pin B may be inserted into the block hollow portions 11, 13, 15 by moving the link pin in its longitudinal direction through the hollow portions 11, 13, 15 but contact may be made with the link pin B in those hollow portions due to the openings defined by the pairs of spaced jaws.

As seen in Figures 3 and 5 the link pin B in the block hollow portions 12, 14 is spaced from the block A due to the balls or anti-friction means D; and, the same link pin B disposed in hollow portions 11, 13, 15 makes direct contact with the adjoining block (Fig. 6) and is adapted to be stationarily held therein by means to be described.

The link pin B in the track shoe of Figures 3 and 9 has two sets of circumferential grooves 30, 31 thereon and the sets are disposed an unequal distance from a point midway between the ends of the pin B. The link pin grooves 30, 31 are hardened and serve to confine balls or antifriction means D in spaced relationship to the block A. The hardened portions of the link pin grooves are preferably disposed an unequal distance from a point midway between the ends of the link pin, so that after some block wear has occurred due to the balls D moving thereon the link pin B may be reversed end for end in the block A so that in the latter position the balls D confined by the link pin grooves 30, 31 will contact block portions not contacted in the former position of the link pin; it is thus seen that by this expedient the block A may be used practically twice as long than if the circumferential sets of grooves 30, 31 on the link pin were spaced equal distances from a point midway between the pin ends.

In the preferred embodiment of my invention the balls or anti-friction means D are disposed in individual circumferential grooves comprising the sets 30, 31; in Fig. 5 there are 18 balls per groove but it is understood, of course, that a greater or lesser number of balls or anti-friction means D may be placed in one of the circumferential grooves. Also as seen in Fig. 27 the plurality of grooves comprising a set might partake of a single continuous spiral groove 305 and in that instance the number of balls in the spiral groove corresponds substantially to the total number in a set 30, 31, (Fig. 9) of circumferential grooves.

It is thus seen that the balls or anti-friction means D make direct contact with the block A and the link pin B and substantially all compression and tension forces between adjoining shoes are transmitted through the balls or anti-friction means D.

In my embodiment in Fig. 3, split end thrust resilient rings 12a, 14a are releasably embedded in grooves in the block hollow portions 12, 14, respectively, at corresponding opposite ends of the link pin B in such a relation to the balls or anti-friction means D comprising the outer rows of balls so as to contact the same. It is thus seen that the outer rows of balls D besides transmitting compression and tension forces between the block A and the link pin B, also serve to transmit end thrust forces, i. e., end thrust rings 12a, 14a maintain link pin B in fixed axial relationship to block A. In Fig. 3, it is noted that link pin shoulders 30s, 30t cooperate with the block portions 15s, 11t respectively of adjoining blocks so as to limit lateral movement of block portions 15, 11 with respect to the link pin B.

Lubricating fluid closure members E are disposed between the block A and link pin B and maintain lubricating fluid which is introduced through link pin channel 32, 32b in surrounding relationship to the balls or anti-friction means D comprising a bearing. Removable plug 32a in link pin B retains the lubricating fluid. In some instances lubrication of the balls D comprising a bearing might not be necessary and in that case the closure members E maintain the balls D dust and dirt free.

In assembling applicant's individual blocks A, each having one link pin B per block, to form the composite track, block hollow portions 11, 13, 15 have adjoining portions 12, 14 of adjoining blocks sandwiched therebetween with one common link pin B passing through hollow portions 11, 12, 13, 14, 15. A grouser or cleat C having faces 40a thereon adapted to cooperate with correspondingly situated link pin faces 30a is inserted between block jaws 11a, 13a, 15a (Figs. 4, 5 and 6) and contacts the link pin B, so as to hold it stationary in the block hollow portions 11, 13, 15. Fastening means such as permanent rivets 41 or threaded bolts 42 (for example see Fig. 20) maintain grouser or cleat C between jaws 11a, 13a, 15a. Rivets 41 and threaded bolts 42 are shown in applicant's preferred embodiment of his invention; permanent rivets 41 may be used throughout the track but then in that case threaded bolts 42 (Fig. 20) are used at spaced points along the track whereby the track may be more conveniently assembled and disassembled at those spaced points. One important feature of applicant's construction is that rivets 41 or threaded bolts 42 (Fig. 20) are subjected to practically no track or road stress but function merely to hold the cleat or grouser C between pairs of spaced jaws 11a, 13a, 15a.

The closure member E (Fig. 7) comprises a sleeve 50 of elastic material such as rubber, or synthetic rubber with at least one and preferably two circumferential grooves 50a therein for the reception of metallic rings 51. The inner diameter of sleeve 50 is slightly undersize so that the inherent resiliency of sleeve 50 maintains it on link pin B and assures a fluid-tight connection between link pin B and sleeve 50. The metallic ring 51 extends beyond the outer diameter of sleeve 50 and makes metallic contact with one of the correspondingly situated block hollow portions 12, 14 whereby a fluid-tight connection between block A and the sleeve 50 is assured.

The track guide F is formed separately and two of them are welded or bolted to a block A whereby the track guides may be supplied as separate units for damaged tracks. The track guide F (Figs. 13, 14, 15) comprises a unitary member having a portion 60a extending substantially perpendicular to the track, a second flanged portion 60b integrally formed to the first portion and extending approximately twenty-five degrees from said perpendicular direction 60a, and a base portion 60c formed integral with the first portion 60a and extending perpendicular thereto. The base portion 60c has a hole 60d therethrough for the passage of fastening means similar to a bolt. In order to bolt wheel guide F to a track shoe, fastening bolt 60e (Fig. 3) is inserted through track guide hole 60d in thread engaging relation to block A.

The composite track is adapted to be propelled by a wheel sprocket (not shown) adapted to engage the outer surfaces of block hollow portions 11, 15.

It is noted that the block hollow portions 12, 14 have projections 12s, 14s extending therefrom which cooperate with the body portions of adjoining blocks so as to limit relative movement between adjoining blocks when the track is disassembled from the associated vehicle.

Figs. 16-20 disclose a modified track construction in which there is no center bearing as in the previous arrangement and the balls or antifriction means $D_1$ extend substantially the length of a hollow portion 112 similar to one of the hollow portions 12, 14 in the previous figures. Link pin lubricating fluid channel 132, 132b serves to conduct lubricating fluid to a point substantially midway between the two sets 130, 131 of grooves containing balls $D_1$, each set of which comprises a bearing. In this instance also the sets 131, 132 of grooves containing balls $D_1$ may be disposed unequal distances from a point midway between the ends of the link pin whereby end for end reversal of the link pin $B_1$ in block $A_1$ will find balls $D_1$ contacting unworn portions of block $A_1$.

Referring to Fig. 20. the link pin $B_1$ is provided with flat portions 130a adapted to contact the raised flat surface 140a of the cleat or grouser $C_1$ so as to prevent relative rotation between those two elements. Bolt 42 passing through the grouser or cleat $C_1$ and also through spaced jaws 115a is screw-threadedly held in one of the jaws 115a. It is noted that bolt 42 is subjected to substantially no road stress as the cleat $C_1$ engages the ground but bolt 42 has for its primary function to hold cleat $C_1$ between the spaced jaws 115a. Jaws 115a are extensions of tubular portion 115 and is similar in nature and function to the tubular portion 15 in the previous figures. Tubular portion 111 and jaws 111a (Fig. 19a) are of the same nature and perform the same functions as tubular portion 115 and jaws 115a. One important feature of the structure shown in Fig. 20 is that when bolt 42 is removed the link pin $B_1$ can be slipped out of hollow portion 115 by moving the pin $B_1$ in its radial direction; it is noted that in the structure of Fig. 6 longitudinal movement of pin B in hollow portion 13 was necessary to separate the pin B from the hollow portion 13.

Projections 112s on hollow portion 112 are adapted to abut against body portions of adjacent blocks so as to form a stop against excessive relative movement of adjacent blocks when the composite track is disassembled from the vehicle.

End play between link pin $B_1$ and grouser or cleat $C_1$ does not take place due to pin 42a (Fig. 19a) passing through cooperating grooves in the link pin $B_1$ and grouser $C_1$ as seen in Fig. 19a; it is noted that in the structure of Figs. 1-15 end play between those elements was limited by cooperating shoulders 11t, 30t and 15s, 30s respectively.

Figs. 21-24 disclose a preferred track construction and is similar to the previous arrangement disclosed in Figs. 1-15 with the following modifications: fastening means 242a passes through a hole formed by adjacent grooves 30x, 40x in link pin $B_2$ and grouser or cleat $C_2$ respectively so as to positively prevent relative movement therebetween; and, hollow portions 211, 213, 215 similar to hollow portions 11, 13, 15 in Figs. 1-15 have spaced jaws 211a, 213a, 215a in relation thereto whereby one block $A_2$ assembled with its link pin $B_2$ is assembled to an adjoining block $A_2$ by radial movement of link pin $B_2$ through the pairs of spaced jaws. This feature is important and allows ease of assembly. It is noted that in the arrangement disclosed in Figures 1-15 radial movement of the link pin B in any one of the hollow portions 11, 12, 13, 14, 15 was impossible and the component parts of the track had to be threaded on the link pins B. In the arrangement shown in Figs. 21-24 the link pin $B_2$ is threaded through the block hollow portions 212, 214 corresponding to hollow portions 12, 14 and the link pin $B_2$ is then moved radially into adjoining hollow portions 211, 213, 215 similar to hollow portions 11, 13, 15 in adjoining blocks. The parts of Figs. 21-24 similar to those in Figs. 1-15 are given a reference character increased by 200 over those in Figs. 1-15. In Figs. 21-24 cooperating shoulders similar to shoulders 30t, 11t and 30s, 15s in Fig. 3 are not necessary since pins 242a passing through cooperating grooves 30x, 40x and 30y, 40y in the link pin $B_2$ and grouser $C_2$ lock the frame $A_2$, link pin $B_2$ and grouser $C_2$ together.

Fig. 25 discloses a modified bearing arrangement and the anti-friction means $D_3$ in this instance partake of a combination of balls 300 and roller bearings 301. The balls 300 and roller bearings 301 are held in the link pin by suitable recesses and end thrust is taken by rings 314a.

Fig. 26 discloses a modified bearing arrangement and in this instance the anti-friction means $D_4$ partake solely of roller bearings. The roller bearings are held in link pin recesses and end thrust is taken by rings 414a.

Fig. 27 discloses a modified bearing arrangement and in this instance the anti-friction means $D_5$ partake of balls disposed in one continuous groove in link pin B; end thrust rings 514a or set screws 515 maintain the balls in the link pin groove.

Fig. 28 discloses a modified bearing arrangement and the anti-friction means D6 in this instance partakes of a compressed fabric material which may or may not be impregnated with a lubricating material such as graphite or oil. The means D6 preferably is in the shape of a sleeve.

Fig. 29 discloses a modified bearing arrangement and the anti-friction means D7 in this instance partakes of a self-lubricating material formed as a sleeve. Such self-lubricating material is of the type known in the art as Oilite or Superoilite and consists of powdered copper which is mixed with ferrous material and lubricating fluid and then compressed.

The modified cleat or grouser C3 of Fig. 30 has attached thereto a resilient road pad 80 of rubber or like material as by vulcanization. Grousers of this type having a resilient road pad may be assembled on each track shoe or alternate track shoes when the track laying vehicle is adapted to travel over hard roads.

I claim:

1. In a track including at least two blocks, a link pin having a face thereon, a grouser having a face thereon cooperating with the link pin face, means for holding the link pin in rotatable spaced relationship within one of the blocks, and means for fastening the grouser to the other one of the blocks.

2. In a track, including at least two blocks, a link pin, means for holding the link pin in rotatable spaced relationship within one of the blocks, a grouser, cooperating means between the link pin and grouser for holding the link pin in non-rotative relationship with respect to the grouser, and means for fastening the grouser, link pin assembly to the other block.

3. The same as in claim 2 and the first recited means comprising balls.

4. The same as in claim 2 and the first recited means comprising ball bearing members.

5. The same as in claim 2 and the first recited means comprising elastic material.

6. The same as in claim 2 and the first recited means comprising a metal bushing.

7. In a track shoe, a block having a hollow portion, a link pin having a spiral groove therein and disposed in the block hollow portion and balls in the spiral groove for spacing the link pin from the block.

8. In a track including at least two blocks, one of said blocks having a plurality of coaxial spaced hollow portions, a link pin passing through the spaced hollow portions and having an exposed surface therebetween, means for holding the link pin in rotatable spaced relationship within the hollow portions, a grouser, cooperating means between the link pin and grouser for holding the link pin in non-rotative relationship with respect to the grouser, means for fastening the grouser, link pin assembly to the other block, and said other block having a portion snugly embracing the pin exposed surface.

9. In a track including at least two blocks, one of said blocks having a plurality of coaxial spaced hollow portions, a link pin having its ends extending through the hollow portions and having exposed surfaces therebetween, means for holding the link pin in rotatable relationship within the hollow portion, a grouser, cooperating means between the link pin and grouser for holding the link pin in relative non-rotative relationship with respect to the grouser, the other of said blocks having portions embracing the pin ends and exposed surface, and means for fastening the grouser to the last mentioned block.

10. In a track shoe, a block having a hollow portion, a link pin having a series of circumferential grooves on one end thereof and a second series of circumferential grooves on the other end thereof, said link pin passing through the hollow portion, balls in the grooves and spacing the link pin from the block, said first series being disposed a different distance from a point midway between the ends of the pin than the second series of grooves.

11. In a track shoe, a block having a hollow portion on one end thereof adapted to receive a link pin by threading it therethrough, and said block having on its other end a hollow portion with a radial opening therein adapted to receive a link pin by radial movement of the pin therein.

12. In a track shoe, a block having spaced coaxial hollow portions on one end thereof and adapted to receive a link pin by threading it therethrough, and said block having spaced coaxial hollow portions on the other end thereof with radial openings therein and adapted to receive a link pin by radial movement of the pin through the radial openings.

13. The same as in claim 12 and a stop mounted on the block.

14. The same as in claim 12 and a detachable wheel guide on the block.

15. In a track shoe, a block having spaced coaxial hollow portions on one end thereof and adapted to receive a link pin by threading it therethrough and spaced coaxial hollow portions on the other end thereof with radial openings therein and adapted to receive a link pin by radial movement of the pin therein, and a pair of spaced jaws comprising said radial opening.

16. In a track comprising at least two blocks, one of said blocks having spaced coaxial hollow portions on one end thereof, a link pin having its ends extending beyond the spaced hollow portions and having an exposed surface therebetween, means allowing rotational movement between said one block and link pin, the other one of said blocks having spaced coaxial hollow portions adapted to receive the pin ends and exposed surface portions and having a radial opening therein for radial passage of the link pin, a pair of jaws comprising the radial opening, a grouser, cooperating means between the link pin and grouser allowing non-rotative movement of the pin with respect to the grouser, and means for holding the grouser between the jaws.

17. The same as in claim 16 and stop members between the two blocks.

18. The same as in claim 8 and stop members between the two blocks.

19. The same as in claim 9 and stop members between the two blocks.

20. In a track, a block having a cylindrical hollow portion, a link pin having a circumferential groove therein and disposed in the hollow portion, balls in the groove and spacing the link pin from the block, lubricating fluid closure members disposed between the link pin and block, and said link pin having lubricating fluid channels extending into the space surrounding the balls.

21. The same as in claim 11 and a stop mounted on the block.

22. The same as in claim 11 and a detachable wheel guide on the block.

23. In a track, a circular link pin having hardened groves therein adapted to receive balls and having flat faces thereon spaced throughout the pin length.

24. In a track, a circular pin having a set of grooves therein on each of the pin ends, one of said sets being disposed a distance from a point between the pin ends different than the other set.

25. In a track, a pin having a set of grooves therein on each of the pin ends, said sets being disposed unequal distances from a point midway between the pin ends.

26. In a track, a circular pin having a set of grooves therein on each of the pin ends, said sets being disposed unequal distances from a point midway between the pin ends, said pin having flat surfaces disposed on the ends thereof and between the sets of grooves.

27. In a track, a block having a hollow portion therethrough, a link pin passing through the hollow portion, anti-friction means spacing the link pin from the block, a closure member between the link pin and block portion defining the hollow portion, said closure member comprising: resilient material resiliently engaging the pin, and metallic rings contacting the block portions defining the hollow portion, said metallic rings being carried solely by the resilient material.

28. In a track, a block having a hollow portion, a link pin in the hollow portion, means for rotatably mounting the link pin in the hollow portion, a resilient sleeve resiliently engaging the link pin and carried thereby, and a metallic ring carried by the resilient sleeve and frictionally engaging the block.

29. In a track, a block having a hollow portion, a link pin in the hollow portion and having a plurality of plane surfaces thereon, pairs of spaced jaws on the block and defining an opening for axial movement of the pin into the hollow portion, a grouser having plane surfaces thereon contacting the pin plane surfaces, and means for fastening the grouser between the spaced jaws.

30. In a track comprising at least two blocks, one of said blocks having spaced coaxial hollow portions on one end thereof, a link pin having its ends extending beyond the spaced hollow portions and having an exposed surface therebetween, anti-friction means allowing rotational movement between said one block and link pin, the other one of said blocks having spaced coaxial hollow portions adapted to receive the pin ends and exposed surface portions and having a radial opening therein for radial passage of the link pin, a pair of jaws comprising the radial opening, a grouser, cooperating means between the link pin and grouser allowing non-rotative movement of the pin with respect to the grouser, means for holding the grouser between the jaws, means for limiting radial movement of the link pin with respect to the first mentioned block, and means for limiting radial movement of the link pin with respect to the second mentioned block.

31. In a track, a block having a hollow portion, a link pin passing through the hollow portion and having a groove therein, anti-friction means between the block and link pin, an end thrust ring carried by the block and contacting the anti-friction means, a second block engaging said link pin, a grouser extending substantially parallel to the axis of the link pin and having a groove therein, said second block having portions partially encircling the grouser and link pin and fastening means extending through the second block portions and the link pin groove and the grouser groove, and means for fastening the grouser to the second block.

32. In a track, a block, a grouser, a link pin passing through the block, a bearing separating the link pin from the block, means for confining the bearing to a certain region on the pin, end thrust means carried by the block and contacting the bearing, a second block engaging the link pin and having portions partially encircling the link pin and grouser, means for fastening the grouser to said portions of the second block, and means for bonding the link pin, grouser and said portions of the second block against relative movement.

33. In a track, a block, a grouser, a link pin passing through the block and rotatably mounted therein, means for maintaining the pin against axial movement in the block, a second block having portions partially encircling the link pin and grouser, means for fastening the grouser to said portions of the second block, and means for bonding the link pin, grouser and said portions of the second block against relative movement.

HARRY A. KNOX.